(12) United States Patent
Nara

(10) Patent No.: US 7,113,647 B2
(45) Date of Patent: Sep. 26, 2006

(54) REMOVAL OF BACKGROUND NOISE OF IMAGE DATA BY AN IMAGE PROCESSING DEVICE OR IMAGE READING APPARATUS

(75) Inventor: Wataru Nara, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 619 days.

(21) Appl. No.: 10/097,595

(22) Filed: Mar. 15, 2002

(65) Prior Publication Data
US 2002/0154830 A1    Oct. 24, 2002

(30) Foreign Application Priority Data
Mar. 15, 2001    (JP)    ............... 2001-073503

(51) Int. Cl.
G06K 9/40    (2006.01)
H04N 5/21    (2006.01)
(52) U.S. Cl. ................ 382/254; 382/275; 348/607
(58) Field of Classification Search ............... 382/254, 382/260, 274, 275, 282, 284; 348/607; 358/3.26, 358/3.27, 463, 512, 518
See application file for complete search history.

(56) References Cited

U.S. PATENT DOCUMENTS

| | | | | |
|---|---|---|---|---|
| 4,281,342 A | * | 7/1981 | Ueda et al. | .................... 348/94 |
| 4,602,294 A | | 7/1986 | Yamada | |
| 5,099,322 A | * | 3/1992 | Gove | ......................... 348/700 |
| 5,317,420 A | * | 5/1994 | Kuwahara | .................. 358/463 |
| 5,329,382 A | * | 7/1994 | Mita | ......................... 382/192 |
| 5,384,621 A | * | 1/1995 | Hatch et al. | .................. 399/42 |
| 5,689,590 A | * | 11/1997 | Shirasawa et al. | .......... 382/254 |
| 5,706,368 A | | 1/1998 | Mita | |
| 5,850,298 A | * | 12/1998 | Narahara et al. | ........... 358/518 |
| 5,929,929 A | * | 7/1999 | Yang | .......................... 348/565 |
| 6,307,962 B1 | * | 10/2001 | Parker et al. | ............... 382/170 |
| 6,323,957 B1 | * | 11/2001 | Ball | ........................... 358/1.9 |

FOREIGN PATENT DOCUMENTS

| | | |
|---|---|---|
| JP | 6-311359 | 11/1994 |
| JP | 06-311359 | 11/1994 |

OTHER PUBLICATIONS

Ali "Background Noise Detection and Cleaning in Document Images", IEEE, pp. 758-792, 1996.*
U.S. Appl. No. 10/097,595, filed Mar. 15, 2002, Nara.
U.S. Appl. No. 10/612,933, filed Jul. 7, 2003, Ando et al.
U.S. Appl. No. 09/961,256, filed Sep. 25, 2001, Pending.
U.S. Appl. No. 10/097,595, filed Mar. 15, 2002, Pending.
U.S. Appl. No. 09/662,173, filed Sep. 14, 2000, Pending.

* cited by examiner

Primary Examiner—Daniel Miriam
(74) Attorney, Agent, or Firm—Oblon, Spivak, McClelland, Maier & Neustadt, P.C.

(57) ABSTRACT

An image processing device includes a background noise detecting device configured to detect from image data of an image, background noise data of the image data. An image memory stores the image data, and an inputting/outputting device inputs and outputs the image data into and from the image memory. A background noise data removing device removes the background noise data from the image data outputted from the image memory by the inputting/outputting device. An on/off device turns on and off a background noise data removing operation of the background noise data removing device according to an external control signal.

11 Claims, 5 Drawing Sheets

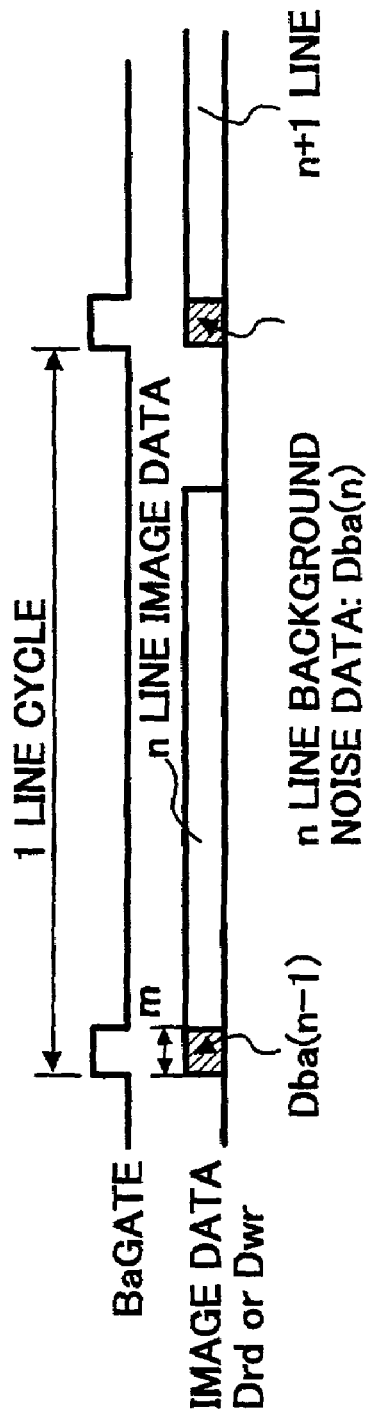

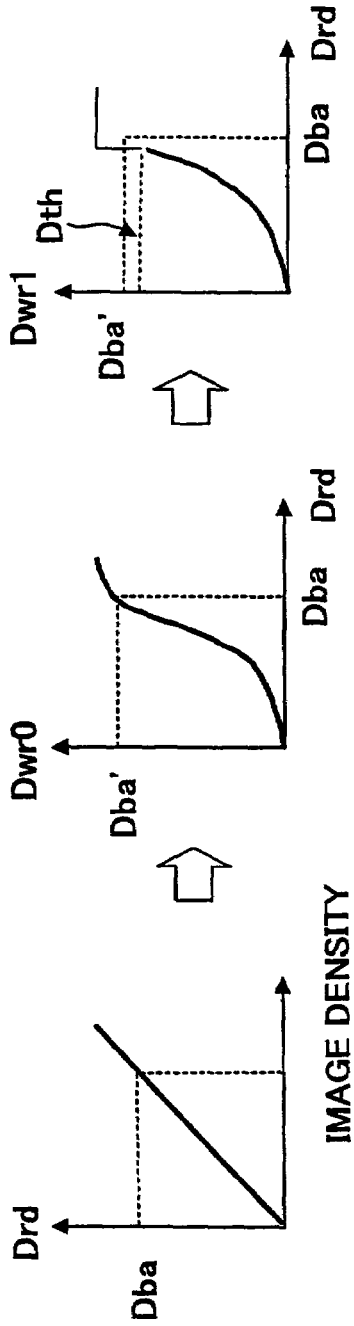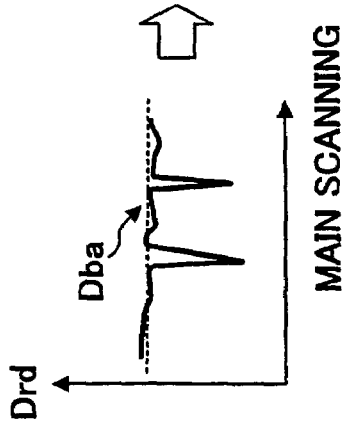

REMOVAL OF BACKGROUND NOISE OF IMAGE DATA BY AN IMAGE PROCESSING DEVICE OR IMAGE READING APPARATUS

BACKGROUND OF THE INVENTION

1. Field of the Invention

The present invention relates to the removal of background data from image data by an image processing device or image reading apparatus.

2. Discussion of the Background

In the field of image processing and image reading, it is often desirable to remove background noise from image data representing an image. The removal of background noise is an improvement in the quality of a duplicated image.

A disadvantage of a conventional image processing device or image reading apparatus, such as a digital copying machine, is that a background noise removing function cannot be switched on and off during a print job. This is disadvantageous, as in some documents, it is desirable for only portions of the document to have background noise removed. For example, it would be desirable in a document that included both text and pictures to remove any background noise below a certain threshold in the text portion, while not removing any of the background noise in the picture portion. The removal of background noise from duplicated text will insure that the text appears in its original form, while removal of background noise in a duplicated picture may cause deterioration of the quality of the duplicated picture. Accordingly, there is a long felt need for an image processing device or image reading apparatus that can selectively remove background noise.

SUMMARY OF THE INVENTION

The present invention has been made in view of the above-discussed and other problems and addresses the above-discussed and other problems.

Embodiments of the present invention relate to an apparatus comprising a background noise detector, memory, and a background noise remover. The background noise detector is arranged to detect background noise from image data of an image. The memory is arranged to store image data. The background noise remover is arranged to remove background noise detected by the background noise detector from image data stored in the memory. The background noise remover can be enabled or disabled in response to a control signal. As the background noise is removed from the image data after the image data is stored in the memory, the removal of the background noise can be selectively enabled or disabled in response to a control signal. These embodiments are advantageous, as a document can be duplicated with portions having background noise removal and portions not having background noise removal. Further, this advantage can be accomplished by scanning the original document only once.

In embodiments of the present invention, the memory is arranged to store the background noise data detected by the background noise detector with the corresponding image data. In embodiments of the present invention, the background noise data corresponds to the image data in a main scanning direction of the image. In embodiments of the present invention, the background noise detector detects the background noise intensity level of at least a portion of the image data.

Embodiments of the present invention also relate to a method of detecting background data from image data of an image, storing the image data in a memory, removing detected background data from image data stored in the memory, and enabling or disabling the removing of detected background noise data in response to a control signal.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 4 is a timing chart illustrating a process of the digital copying machine;

FIG. 5 illustrates a process of a background noise removing device; and

FIGS. 6A1, 6A2, 6B1, 6B2, 6C1, and 6C2 are diagrams illustrating a process of a digital copying machine.

DETAILED DESCRIPTION OF THE PREFERRED EMBODIMENTS

Figure 1:
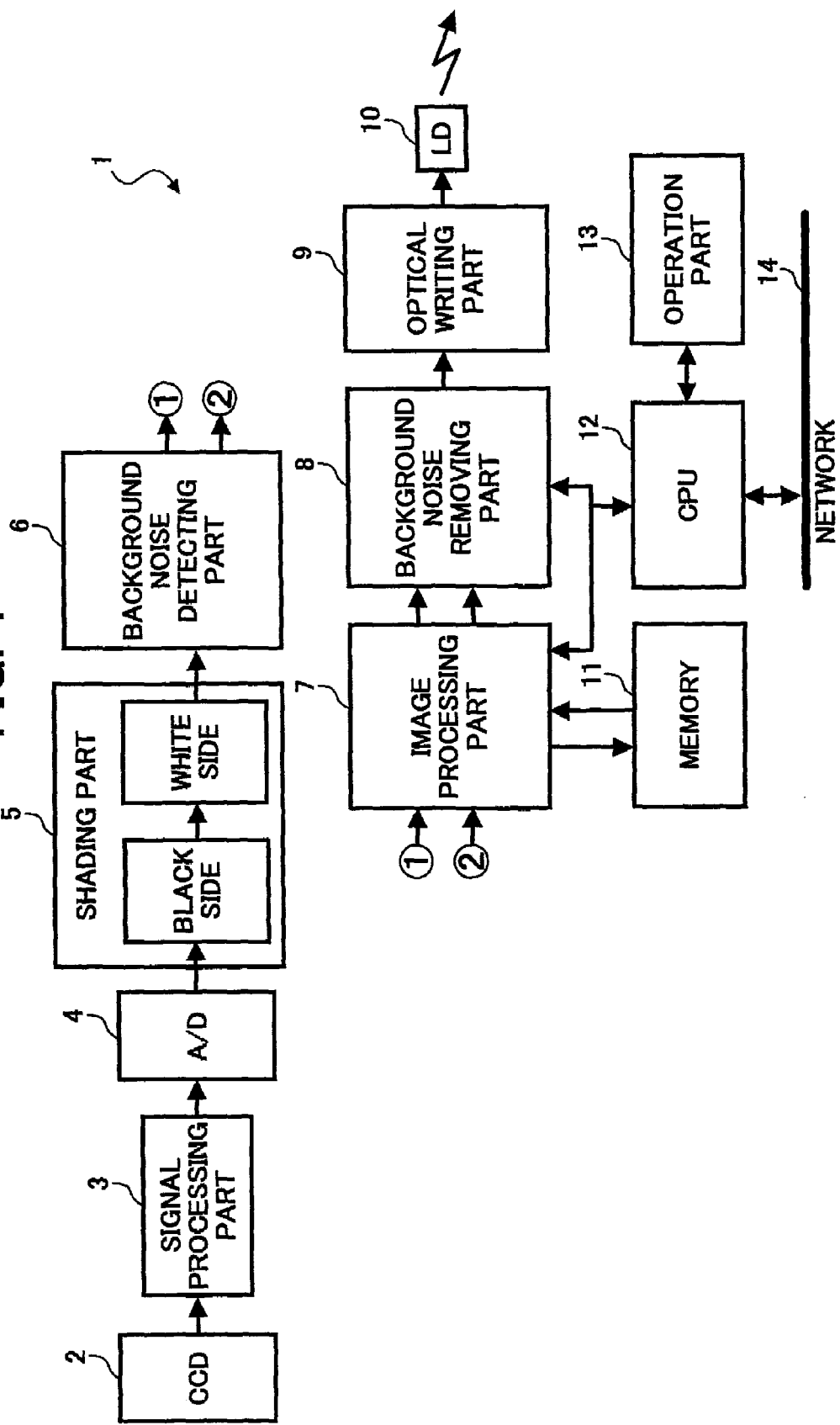
FIG. 1 is a block diagram illustrating electrical connection of a digital copying machine according to a preferred embodiment of the present invention.

Referring now to the drawings, wherein like reference numerals designate identical or corresponding parts throughout the several views, an embodiment of the present invention are described.

FIG. 1 is a block diagram illustrating electrical connection of a digital copying machine 1 according to an embodiment of the present invention. In the digital copying machine 1, image data of an image of an original document is photo-electrically converted by CCD 2. CCD 2 is a photo-electrical converting element. The converted image data is processed by a predetermined signal process at a signal processing part 3, and is then converted from analog data to digital data by an A/D converter 4. A shading part 5 then performs shading correction processes for the black side and the white side on the digital data, so that image data Drd0, in which illumination variation, and sensitivity variation of the CCD 2 have been corrected, is outputted. The image data Drd0 is inputted into a background noise detecting device 6 so that background noise data of the image data Drd0 is detected. An image processing part 7 performs onto image data a Modulation Transfer Function (MTF) correction process, a filtering process, a magnification changing process, and a γ conversion process. A background noise data removing part 8 removes background noise data of image data. Image data after having been processed with the above-described processes is modulated at an optical writing part 9, and is converted to an exposure beam according to the image data by a laser diode 10. The image is electrophotographically formed by the exposure beam. An image memory 11 stores image data processed by the image processing part 7. A CPU 12 controls each part of the digital copying machine 1. An operation part 13 receives various operating instructions from a user. The digital copying machine 1 may be connected to a network 14, such as a LAN, via a predetermined interface.

Figure 2:
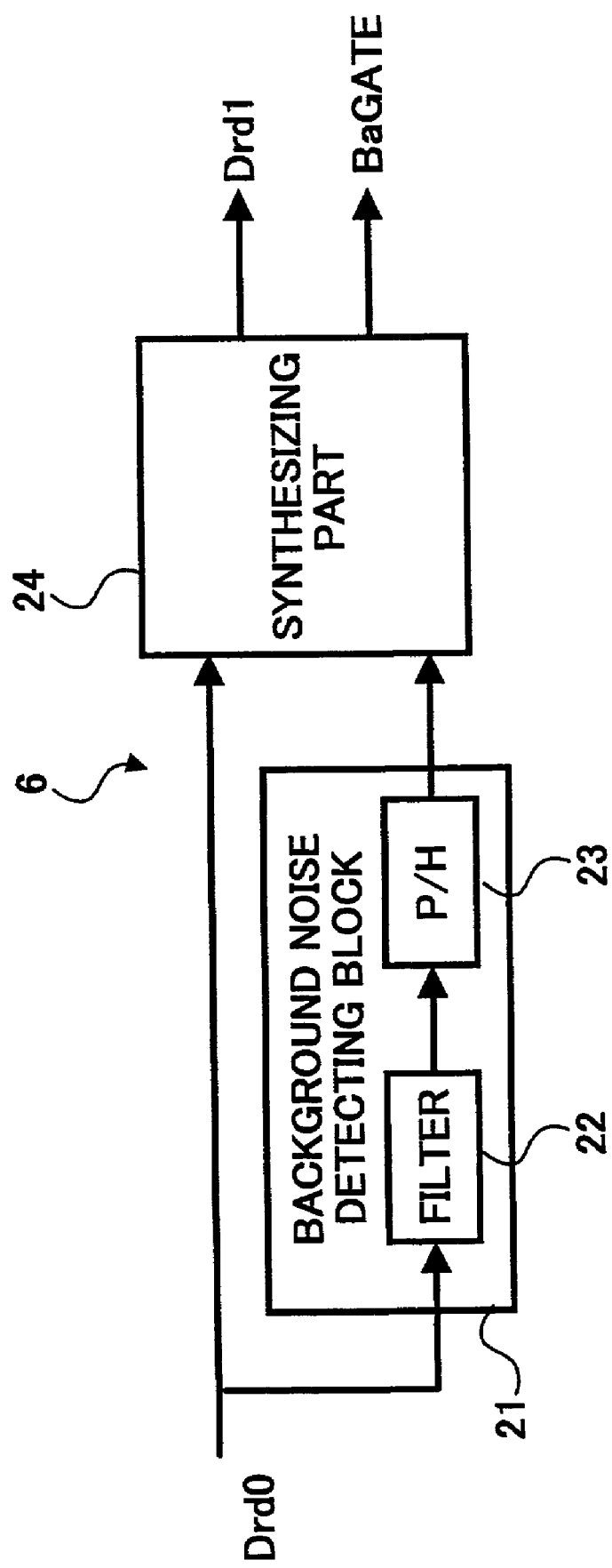
FIG. 2 is a block diagram of a background noise detecting device of the digital copying machine.

As illustrated in FIG. 2, at background noise detecting device 6, if a background noise removing mode is set, a background noise detecting block 21 detects background noise data Dba from the image data Drd0 after having been processed with the shading correction processes. A synthesizing part 24 serving as an adding device adds the background noise data Dba for "m" picture elements to image data of a following line at the forefront thereof in a main scanning direction so as to be image data Drd1 (see FIG. 4), and outputs the image data Drd1 to the image processing part 7 at the next step. The background noise detecting device 6 outputs at the same time a gate signal BaGATE indicating a position in the image data where the background noise data Dba is attached.

In the background noise detecting block 21, a filter 22 applies a filtering process for smoothing image data to the image data Drd0 to remove a noise effect, and thereafter a peak-hold circuit 23 peak-holds the image data Drd0, so that the background noise data Dba is precisely detected.

By making the background noise data Dba to a size for "m" picture elements, which is larger than a size of a filter of the image processing part 7 at a subsequent step, the background noise data Dba is not changed at a center part thereof, asserted with the gate signal BaGATE, by an effect of data outside of the gate of the gate signal BaGATE, and thereby background density information remains stored in the image memory 11.

In embodiments of the present invention, a method of using the gate signal BaGATE is used as described above for identifying a background noise data area of image data. A similar effect can be obtained by fixing the size of background noise data, e.g., the number of picture elements, to be added at the forefront of image data in advance. However, by identifying a background noise data area of image data with a gate signal, even when the size of a filter of the image processing part 7 differs between models, an algorithm for detecting background noise data at the image processing part 7 needs not be changed according to the size of the filter of the image processing part 7. Accordingly, a common algorithm for detecting background noise data can be used at the image processing part 7 and the background noise removing device 8. Therefore, in these embodiments, the method of outputting the gate signal BaGATE is used.

The outputted image data Drd1 is stored in the image memory 11 by the image processing part 7 serving as an inputting/outputting device.

When printing out the image data Drd1, the image data Drd1 is read out from the image memory 11, and based upon information inputted from the operation part 13 or a host computer connected with the network 14 and in accordance with an instruction from the CPU 12, the image processing part 7 performs necessary image processing processes (e.g., MTF correction, magnification changing, γ conversion, etc.) and the background noise data removing device 8 performs a background noise removing process on the image data Drd1.

Figure 3:
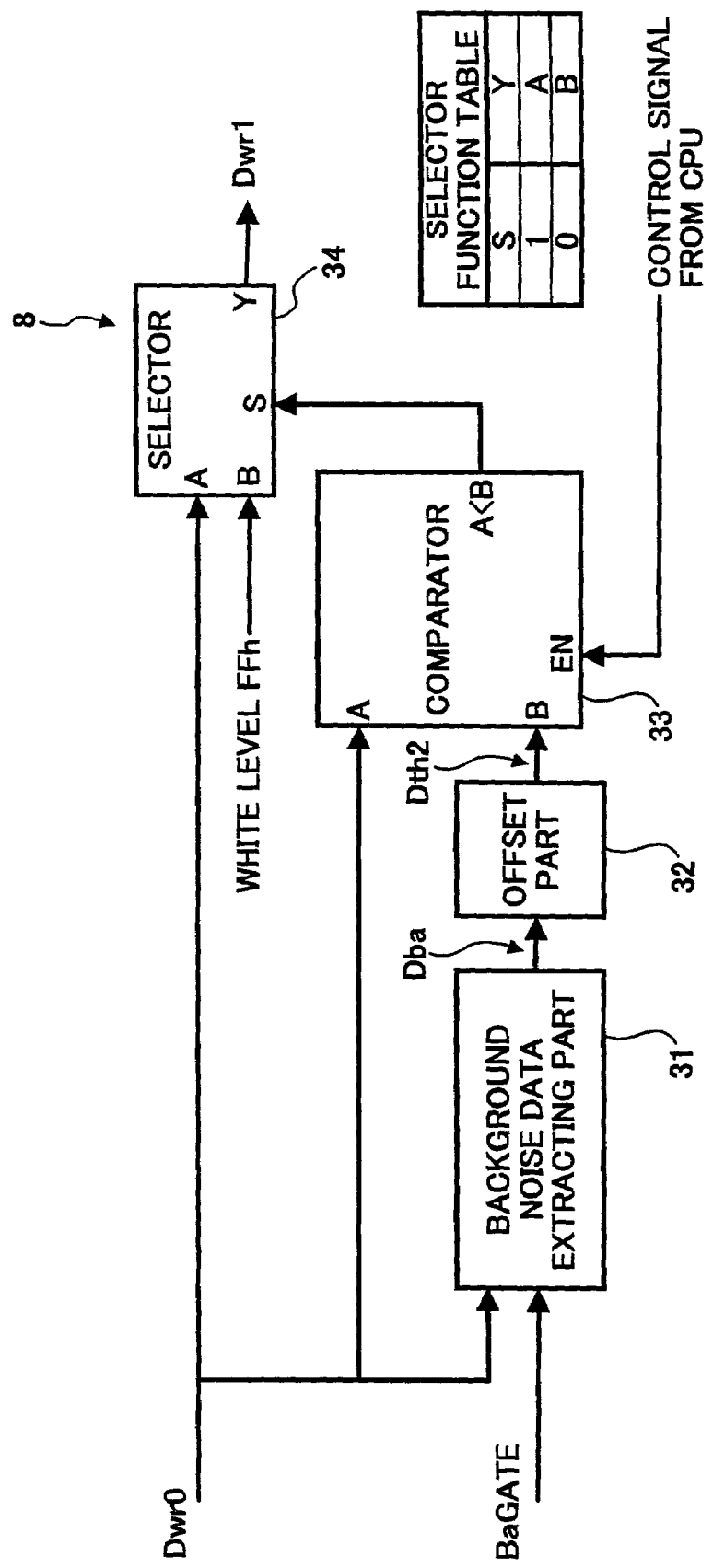
FIG. 3 is a block diagram of a background noise removing device of the digital copying machine.

As illustrated in FIG. 3, in the background noise data removing device 8, a background noise data extracting part 31 detects from image data Dwr and the gate signal BaGATE read out from the image memory 11, background noise data Dba' after having been processed with the image processing processes. Here, if the background noise data Dba' itself is set as a threshold value Dth1' for discriminating background noise data from image data, a part of the background noise data Dba', corresponding to background noise caused by an effect of the image processing processes, may be outputted as image data. Accordingly, for avoiding the part of the background noise data Dba', corresponding to background noise caused by an effect of the image processing processes, from being outputted as image data, one of the following operations is performed at an offset part 32 to obtain another threshold value Dth2;

1. Subtracting predetermined data for offsetting, i.e., Dth2=Dth1'−offsetting data,
2. Subtracting a predetermined ratio of image data, i.e., Dth2=Dth1'×(1−α),
3. Combining the above-described operations 1 and 2, i.e., Dth2=Dth1'×(1α)−offsetting data.

Thereafter, the threshold value Dth2 obtained as above and the image data Dwr are inputted into terminals A and B of a comparator 33, respectively, and by controlling the comparator 33 according to the conditions as indicated by a table of FIG. 5, background noise data of image data is removed.

Specifically, by controlling an EN terminal of the comparator 33 with a control signal from the CPU 12, the control signal is controlled to be at a H level where a comparator function of the comparator 33 is turned on (i.e., a background noise removing mode is set) or at an L level where the comparator function is turned off so that an outputting level of the comparator 33 is fixed to the H level (i.e., the background noise removing mode is released). Thereby, image data Dwr1 in which background noise data has been removed or image data Dwr1 in which background noise data has not been removed can be selectively outputted from a selector 34. Thus, turning on or off a background noise removing function for image data is controlled by the CPU 12.

Further, as described above, the background noise data removing part 8 is arranged downstream of the image memory 11. Accordingly, switching between turning on and off the background noise data removing function is realized without a need of reading an image of an original document a second time.

Referring to FIGS. 6A1, 6A2, 6B1, 6B2, 6C1, and 6C2, a background noise data removing function is described in relation to changes in the gamma (γ) and image data of an image.

The image data Drd which has been read has the characteristics indicated by the diagrams illustrated in FIGS. 6A1 and 6A2. FIG. 6A1 illustrates the γ characteristics of image information (image density) of an image of an original document and of the image data Drd, and FIG. 6A2 illustrates the image data Drd viewed in the main scanning direction, in which the background noise data Dba is added.

The image data Drd is thereafter processed with MTF correction and γ conversion processes by the image processing part 7 so as to have the characteristics indicated by the diagrams of FIGS. 6B1 and 6B2. FIG. 6B1 illustrates the γ characteristics of the image data Drd and the image data Dwr0 after having been processed with the image processing processes, and FIG. 6B2 illustrates the image data Dwr0 after having been processed with the image processing processes, viewed in the main scanning direction in which the background noise data Dba' is added.

From FIGS. 6A1, 6A2, 6B1 and 6B2, one of ordinary skill in the art can appreciate that the gamma γ has been converted, the background noise data has been changed, and the image information (image density) has been changed.

The image data Dwr1 having been processed with the background noise data removing process has the characteristics indicated by the diagrams of FIGS. 6C1 and 6C2. FIG. 6C1 illustrates the γ characteristics of the image data Drd and the image data Dwr1 after having been processed with the background noise data removing process, and FIG. 6C2 illustrates the image data Dwr1 after having been processed with the background noise data removing process, viewed in the main scanning direction, in which the threshold value Dth level data is added. From FIGS. 6C1 and 6C2, it can be understood that the background noise data has been removed and the image information has been kept stored.

In the image processing part 7, if the γ conversion process is performed at an earlier stage of image processing processes at the image processing part 7, e.g., before a MTF correction process, because the gamma γ may be changed by the MTF correction process, the γ conversion process needs to be performed again after the MTF correction process. Accordingly, the image processing part 7 may be configured such that the γ conversion process is performed at the last stage in the image processing processes at the image processing part 7 for avoiding the γ conversion process from being repeatedly performed.

Further, it is widely practiced to change the order of performing various image processing processes in accordance with an image forming mode or a magnification ratio. Accordingly, depending upon various conditions, e.g., image forming modes, the order of performing the function of the background noise removing device 8 can be exchanged with that of performing each function of the image processing part 7, so as to realize further increasing the image quality.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 2001-073503 filed in the Japanese Patent Office on Mar. 15, 2001, and the entire contents of which are hereby incorporated by reference.

What is claimed:

1. An apparatus, comprising:
a background noise detector arranged to detect background noise data from image data of an image;
a memory configured to store image data; and
a background noise remover configured to remove the background noise data detected by the background detector from the image data stored in the memory, wherein
the background noise remover can be enabled or disabled in response to a control signal,
wherein said control signal indicates a position in the image data where the background noise data is located.

2. An apparatus, comprising:
means for detecting background noise data from image data;
means for storing image data;
means for removing background noise data from the image data; and
means for enabling or disabling removal of background noise data from the image data,
wherein said control signal indicates a position in the image data where the background noise data is located.

3. A method, comprising steps of:
detecting background noise data from image data of an image;
storing the image data in a memory;
removing the detected background noise data from the image data stored in the memory; and
enabling or disabling the removing of the detected background noise data in response to a control signal,
wherein said control signal indicates a position in the image data where the background noise data is located.

4. An apparatus, comprising:
a background noise detector arranged to detect background noise data from image data of an image;
a memory configured to store image data; and
a background noise remover configured to remove the background noise data detected by the background detector from the image data stored in the memory, wherein
the background noise remover can be enabled or disabled in response to a control signal,
wherein the background noise detector comprises:
a synthesizer having two inputs and two outputs;
a background noise detecting block having an input and connected to one of said two inputs of said synthesizer.

5. The apparatus of claim 4, wherein the background noise detecting block comprises:
a filter; and
a peak-hold circuit.

6. The apparatus of claim 4, wherein one of said two outputs comprises,
a gate signal.

7. An apparatus, comprising:
a background noise detector arranged to detect background noise data from image data of an image;
a memory configured to store image data; and
a background noise remover configured to remove the background noise data detected by the background detector from the image data stored in the memory, wherein
the background noise remover can be enabled or disabled in response to a control signal,
wherein the background noise remover comprises:
a background noise remover having two inputs and an output;
an offset device connected said output of said background noise remover;
a comparator having two inputs, one of said inputs connected to an output of said offset device; and
a selector connected to said comparator.

8. The apparatus of claim 7, wherein one of said two inputs of said background noise remove comprises,
a gate signal.

9. A method, comprising steps of:
detecting background noise data from image data of an image;
storing the image data in a memory;
removing the detected background noise data from the image data stored in the memory; and
enabling or disabling the removing of the detected background noise data in response to a control signal indicating a position in the image data, wherein
said step of detecting comprises outputting a gate signal; and
said step of removing comprises receiving said gate signal.

10. An apparatus, comprising:
a background noise detector arranged to detect background noise data from image data of an image;
a memory configured to store image data; and
a background noise remover configured to remove the background noise data detected by the background detector from the image data stored in the memory, wherein
the background noise remover can be enabled or disabled in response to a control signal, wherein said background noise remover is configured to remove the background noise on the basis of a gate signal provided by the background detector via said memory, said gate signal indicating a position in the image data where the background noise data is attached.

11. The apparatus of claim 10, wherein said background noise remover comprises:

a background noise extractor;
an offset device connected to an output of the background noise extractor;
a comparator connected to an output of the offset device; and
a selector connected to an output of the comparator.

* * * * *